(12) United States Patent
Rao

(10) Patent No.: US 7,644,300 B1
(45) Date of Patent: Jan. 5, 2010

(54) FAST RESYNCHRONIZATION OF DATA FROM A REMOTE COPY

(75) Inventor: Hariprasad Mankude Bhasker Rao, Union City, CA (US)

(73) Assignee: 3PAR, Inc., Fremont, CA (US)

( * ) Notice: Subject to any disclaimer, the term of this patent is extended or adjusted under 35 U.S.C. 154(b) by 444 days.

(21) Appl. No.: 11/738,396

(22) Filed: Apr. 20, 2007

(51) Int. Cl.
*G06F 11/00* (2006.01)

(52) U.S. Cl. ............ 714/5; 714/2; 714/6; 714/15; 714/20; 714/47

(58) Field of Classification Search .......... 714/5, 714/2, 6, 15, 20, 47
See application file for complete search history.

(56) References Cited

U.S. PATENT DOCUMENTS

| | | | | |
|---|---|---|---|---|
| 4,530,054 A | * | 7/1985 | Hamstra et al. | 711/133 |
| 5,724,501 A | * | 3/1998 | Dewey et al. | 714/9 |
| 5,742,792 A | * | 4/1998 | Yanai et al. | 711/162 |
| 5,835,953 A | * | 11/1998 | Ohran | 711/162 |
| 5,953,742 A | * | 9/1999 | Williams | 711/154 |
| 6,088,815 A | * | 7/2000 | West et al. | 714/15 |
| 6,167,531 A | * | 12/2000 | Sliwinski | 714/13 |
| 6,397,307 B2 | * | 5/2002 | Ohran | 711/161 |
| 6,549,921 B1 | * | 4/2003 | Ofek | 707/204 |
| 6,606,694 B2 | * | 8/2003 | Carteau | 711/162 |
| 6,611,901 B1 | * | 8/2003 | Micka et al. | 711/162 |
| 6,654,912 B1 | * | 11/2003 | Viswanathan et al. | 714/42 |
| 6,701,455 B1 | * | 3/2004 | Yamamoto et al. | 714/18 |
| 6,728,736 B2 | * | 4/2004 | Hostetter et al. | 707/204 |
| 6,732,125 B1 | * | 5/2004 | Autrey et al. | 707/204 |
| 6,981,114 B1 | * | 12/2005 | Wu et al. | 711/162 |
| 7,003,692 B1 | * | 2/2006 | Banks et al. | 714/12 |
| 7,139,851 B2 | * | 11/2006 | Fujibayashi | 710/58 |
| 7,246,258 B2 | * | 7/2007 | Chen et al. | 714/6 |
| 7,380,081 B2 | * | 5/2008 | Ji et al. | 711/162 |
| 7,451,345 B2 | * | 11/2008 | Butterworth et al. | 714/6 |
| 2005/0102553 A1 | * | 5/2005 | Cochran et al. | 714/6 |
| 2005/0193245 A1 | * | 9/2005 | Hayden et al. | 714/13 |
| 2005/0203972 A1 | * | 9/2005 | Cochran et al. | 707/204 |
| 2005/0256972 A1 | * | 11/2005 | Cochran et al. | 709/245 |
| 2006/0184587 A1 | * | 8/2006 | Federwisch et al. | 707/200 |
| 2007/0006023 A1 | * | 1/2007 | Fujibayashi | 714/7 |
| 2008/0209258 A1 | * | 8/2008 | Casale et al. | 714/4 |

OTHER PUBLICATIONS

"3PAR Remote copy," 3PARdata, Inc. information brochure, 4 pages.

* cited by examiner

*Primary Examiner*—Scott T. Baderman
*Assistant Examiner*—Loan Truong
(74) *Attorney, Agent, or Firm*—Patent Law Group LLP; David C. Hsia

(57) ABSTRACT

A method for resynchronizing a first copy of data on a first storage system from a second copy of the data on a second storage system includes, at a regular checkpoint interval, the first storage system pushing data in its cache that were modified prior to a checkpoint time to its nonvolatile storage and saving the checkpoint time to its nonvolatile storage. The method further includes, at a regular snapshot interval greater than the checkpoint interval, the second storage system taking snapshots of the second copy of the data. When the first storage system has an uncontrolled shutdown, the second storage system determines the snapshot closest in time to the last checkpoint time and sends the difference between the last snapshot and the second copy of the data to the first storage system to recover data lost during the uncontrolled shutdown.

8 Claims, 5 Drawing Sheets

FAST RESYNCHRONIZATION OF DATA FROM A REMOTE COPY

FIELD OF INVENTION

This invention relates to a method for resynchronizing data between a first system and a second system.

DESCRIPTION OF RELATED ART

FIG. 1 illustrates a system 100 for real-time mirroring of data on a first data storage system 102 (e.g., a primary system) to a second data storage system 104 (e.g., a secondary system) that stores a remote copy of the data. Each write from a host server 106 to primary system 102 is verifiability mirrored to secondary system 104 before the application on host server 106 receives an acknowledgement, thereby guaranteeing data consistency. In step 1, host server 106 writes to cache memory on primary system 102. In data storage systems, writes are typically first stored in cache memory and then later flushed to nonvolatile storage when they are not frequently accessed. Note that "flush" refers to writing the data to a nonvolatile storage and marking the copy of the data in the cache memory as read only and ready to be reused. In step 2, primary system 102 mirrors the write to cache memory on secondary system 104. In step 3, secondary system 104 acknowledges the write to primary system 102. In step 4, primary system 102 acknowledges the write to host server 106. The method above is often referred to as the synchronous mode of data replication.

SUMMARY

In one embodiment of the invention, a method for resynchronizing a first copy of data on a first storage system from a second copy of the data on a second storage system includes, at a regular checkpoint interval, the first storage system pushing data in its cache that were modified prior to a checkpoint time to its nonvolatile storage and saving the checkpoint time to its nonvolatile storage. The method further includes, at a regular snapshot interval greater than the checkpoint interval, the second storage system taking snapshots of the second copy of the data. When the first storage system has an uncontrolled shutdown, the second storage system determines the snapshot closest in time to the last checkpoint time and sends the difference between the last snapshot and the second copy of the data to the first storage system to recover data lost during the uncontrolled shutdown.

BRIEF DESCRIPTION OF THE DRAWINGS

Use of the same reference numbers in different figures indicates similar or identical elements.

DETAILED DESCRIPTION

Figure 1:
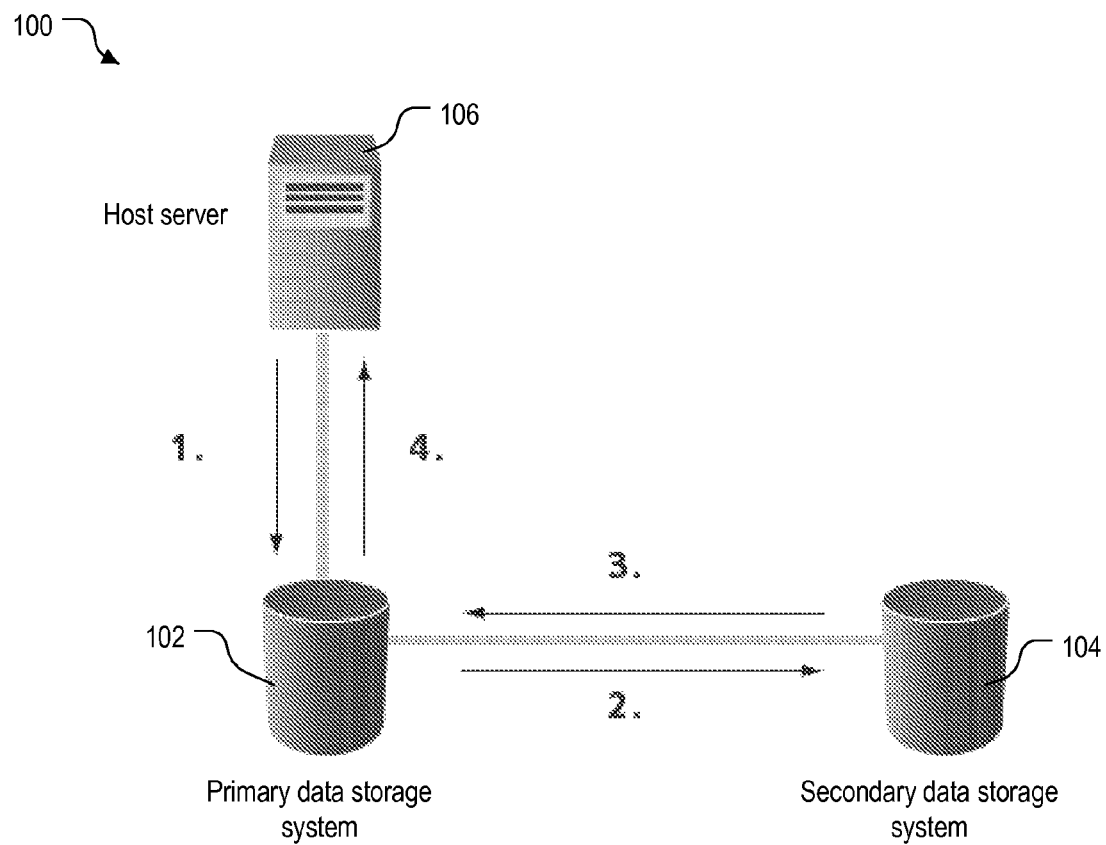
FIG. 1 is a block diagram of a system implementing synchronous mode of remote copy.

During uncontrolled shutdown of a primary system, data in a cache memory that have been acknowledged to a host server and that have not been flushed to a nonvolatile storage are lost and unrecoverable from the primary system. Note that the algorithm that flushes data from the cache memory to the nonvolatile storage are generally not time aware. This implies that the cache memory could have frequently accessed data that were modified long ago but not flushed to the nonvolatile storage.

To recover the lost data, a full resynchronization has to be done by copying the entire volume from the secondary to the primary system. However, the drawback of this would be the large amount of data to be transferred between the two systems. Depending on the amount of data and the bandwidth of the link between the two systems, the time required for a full resynchronization may be substantial.

In embodiments of the invention, checkpoint and time bound snapshot mechanisms are used to address the above problem. On a regular checkpoint interval, the checkpoint mechanism pushes all the data in the cache memory that were first modified prior to the end of the last checkpoint interval (hereafter "checkpoint time") to the nonvolatile storage. Note that "push" is the same as "flush" except it is performed by the checkpoint mechanism instead of a flusher mechanism. Thus, in the event of an uncontrolled shutdown, the data lost in the cache memory are limited to those modified after the checkpoint time. For example, if the primary system had an uncontrolled shutdown at 10:30 a.m. and the last checkpoint time was 10:15 a.m., then the data modified after 10:15 a.m. may have been lost if they have not been flushed to the nonvolatile storage, and all data first modified before 10:15 a.m. have been flushed to the nonvolatile storage. The checkpoint mechanism records the checkpoint time in the nonvolatile storage so it can be read after the primary system returns online from the uncontrolled shutdown.

The time bound snapshot mechanism takes Copy-On-first-Write (COW) snapshots of the remote copy at a snapshot interval of equal to or greater than the checkpoint interval. For example, if the checkpoint interval is 15 minutes, then the time bound snapshot mechanism takes snapshots of the remote copy at least every 15 minutes. A minimum number of snapshots are kept while older snapshots are deleted.

When there is an uncontrolled shutdown of the primary system, a resynchronization process determines the checkpoint time of the primary system and then retrieves the last time bound snapshot created before the checkpoint time. The resynchronization process then determines a snapshot difference between the last snapshot and the remote copy. This snapshot difference will include the data that was modified in the time interval between the checkpoint time and the time of the uncontrolled shutdown since the snapshot difference identifies data modified between (1) the creation of the snapshot prior to the checkpoint time and (2) the time of the uncontrolled shutdown. The resynchronization process sends these differences from the secondary system to the primary system, which enables the primary system to resynchronize with the remote copy. Since the difference covers a short duration, significantly fewer blocks of data needs to be sent from the secondary system to the primary system, thereby making resynchronization more efficient than a full resynchronization.

Figure 2:
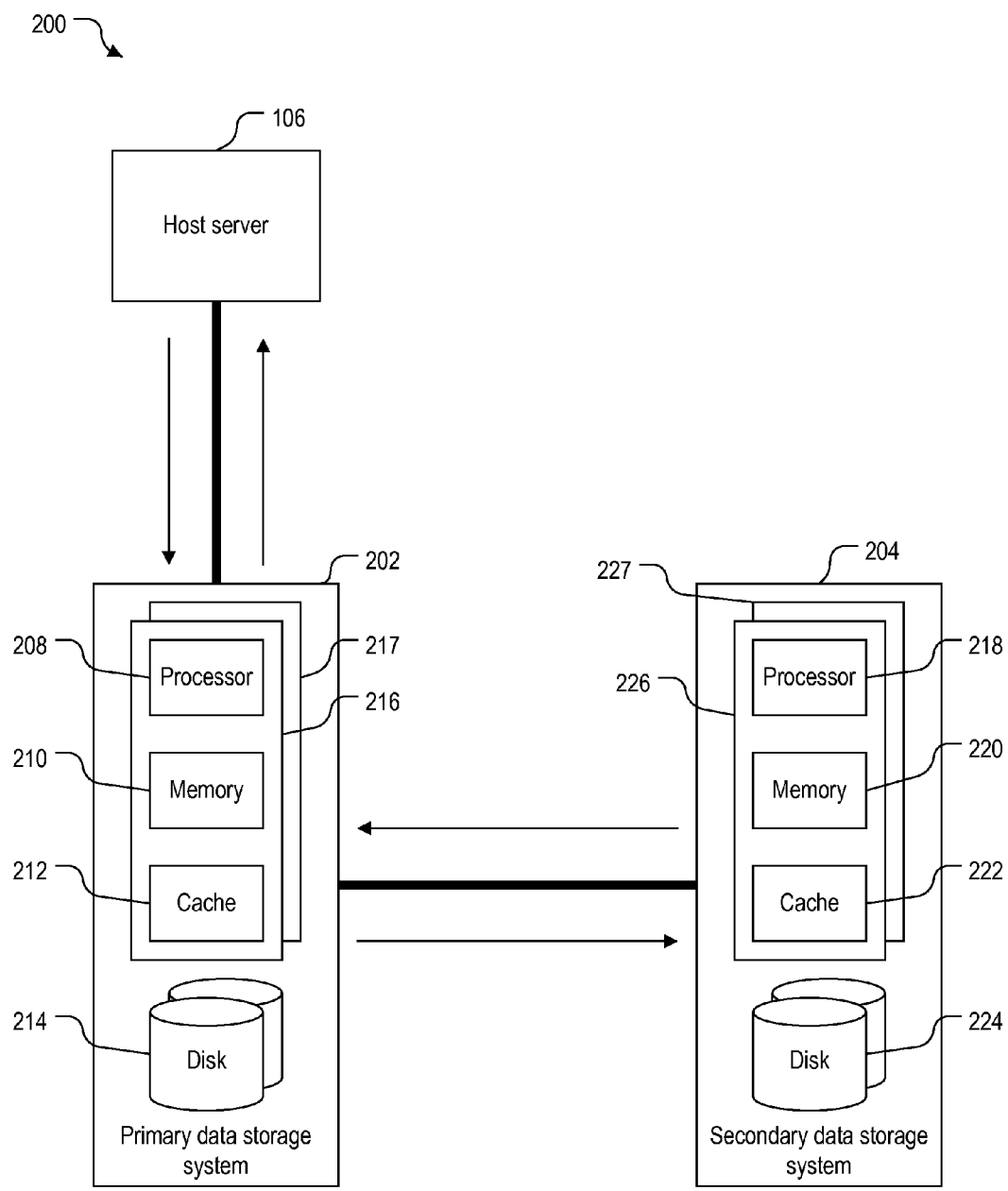
FIG. 2 is a block diagram of a system implementing a method for resynchronizing data on a primary system with a remote copy on a secondary system in one embodiment of the invention.

FIG. 2 illustrates a system 200 that resynchronizes data on a first data storage system 202 (e.g., a primary system) to a remote copy of the data on a second data storage system 204 (e.g., a secondary system) in one embodiment of the invention. In system 200, each write from a host server 106 to primary system 202 is verifiability mirrored to secondary system 204 before the application on host server 106 receives an acknowledgement as described above.

Primary system 202 includes a processor 208 controlling the overall function of primary system 202, a system memory 210 storing primary resynchronization programs executed by processor 208, and a cache memory 212 caching data before flushing to nonvolatile storage 214. Nonvolatile storage 214 may be hard disk drives, flash drives, optical disk drives, magnetic tape drives, or holographic drives.

In one embodiment, processor 208, system memory 210, and cache 212 form a controller node 216 in a cluster of interconnected controller nodes of the same construction. For the sake of clarity, only one additional controller node 217 is illustrated. Clustering of controller nodes provides redundancy, high bandwidth, and scalability to primary system 202. In one example, primary system 202 is an InServ® Storage Server available from 3PARdata, Inc. of Fremont, Calif.

Secondary system 204 is similar to primary system 202. Secondary system 204 includes a processor 218 controlling the overall function of primary system 202, a system memory 220 storing secondary resynchronization programs executed by processor 218, and a cache memory 222 caching data before flushing to nonvolatile storage 224. Secondary system 204 stores the remote copy of the data on primary system 202 in a specific logical volume in nonvolatile storage 224. In one embodiment, secondary system 204 is an InServ® Storage Server available from 3PARdata, Inc. of Fremont, Calif.

In one embodiment, processor 218, system memory 220, and cache 222 form a controller node 226 in a cluster of interconnected controller nodes of the same construction in secondary system 204. For the sake of clarity, only one additional controller node 227 is illustrated. In one example, secondary system 204 is an InServ® Storage Server available from 3PARdata, Inc. of Fremont, Calif.

Figure 3:
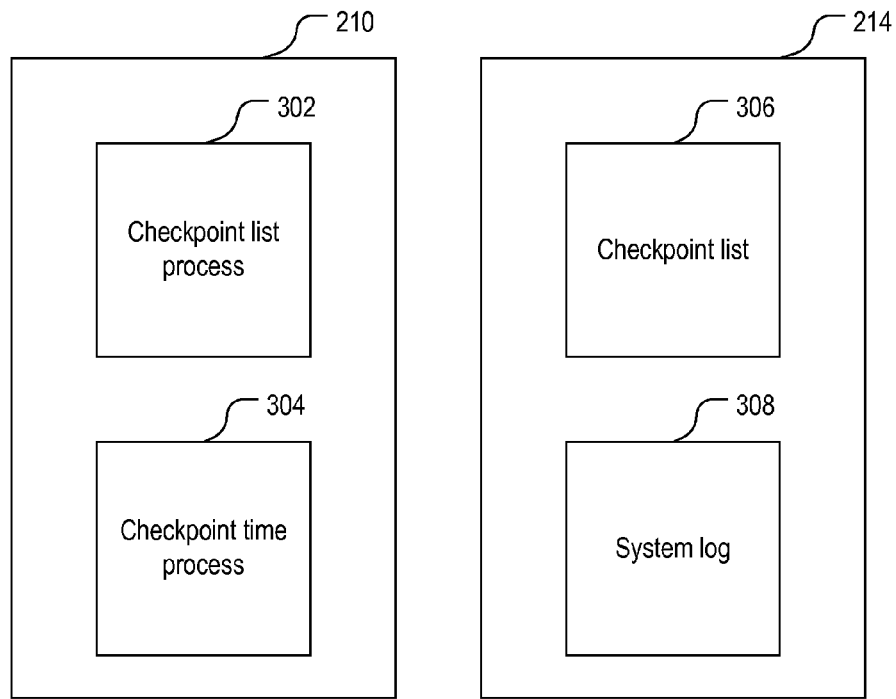
FIG. 3 illustrates processes and data structures on the primary system for resynchronizing the primary and the secondary systems of method of FIG. 2 in one embodiment of the invention.

FIG. 3 illustrates processes and data structures on primary system 202 for the resynchronization process in one embodiment of the invention. System memory 210 stores a checkpoint list process 302 and a checkpoint time process 304 executed by processor 208.

Checkpoint list process 302 generates and updates a checkpoint list 306, which lists the pages of data in cache memory 212 and the time they were modified. Checkpoint list process 302 stores checkpoint list 306 is in nonvolatile storage 214. Checkpoint list 306 may be arranged from oldest to most recently modified pages.

Checkpoint time process 304 is responsible for pushing data from cache memory 212 to nonvolatile storage 214 at a regular checkpoint interval and updating a checkpoint time in a system log 308, which is stored in nonvolatile storage 214.

If primary system 202 has multiple nodes in a cluster, then the processes and the data structures described above for FIG. 3 are implemented in each node of the cluster and the processes are synchronized so there is a global checkpoint time that is common among the nodes of the cluster.

Figure 4:
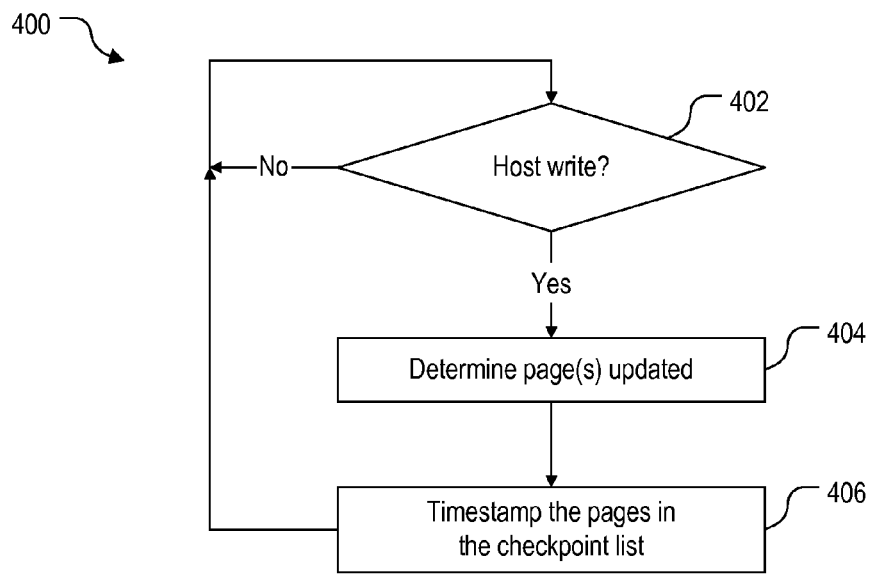
FIG. 4 is a flowchart of a method for a checkpoint list process of FIG. 3 in one embodiment of the invention.

FIG. 4 is a flowchart of a method 400 of checkpoint list process 302 executed by processor 208 in one embodiment of the invention.

In step 402, checkpoint list process 302 determines if there is host write to primary system 202. If so, then step 402 is followed by step 404. If not, then step 402 repeats until there is host write to primary system 202.

In step 404, checkpoint list process 302 determines the page or pages in cache memory 212 that were modified by the host write. Step 404 is followed by step 406.

In step 406, checkpoint list process 302 timestamps the page or pages that were modified in checkpoint list 306 in nonvolatile storage 214. As described above, the timestamps of the pages in cache memory 212 allows checkpoint time process 304 to push data from cache memory 212 to nonvolatile storage 214 at a regular checkpoint interval. Step 406 is followed by step 402 where checkpoint list process 302 waits for the next host write.

Figure 5:
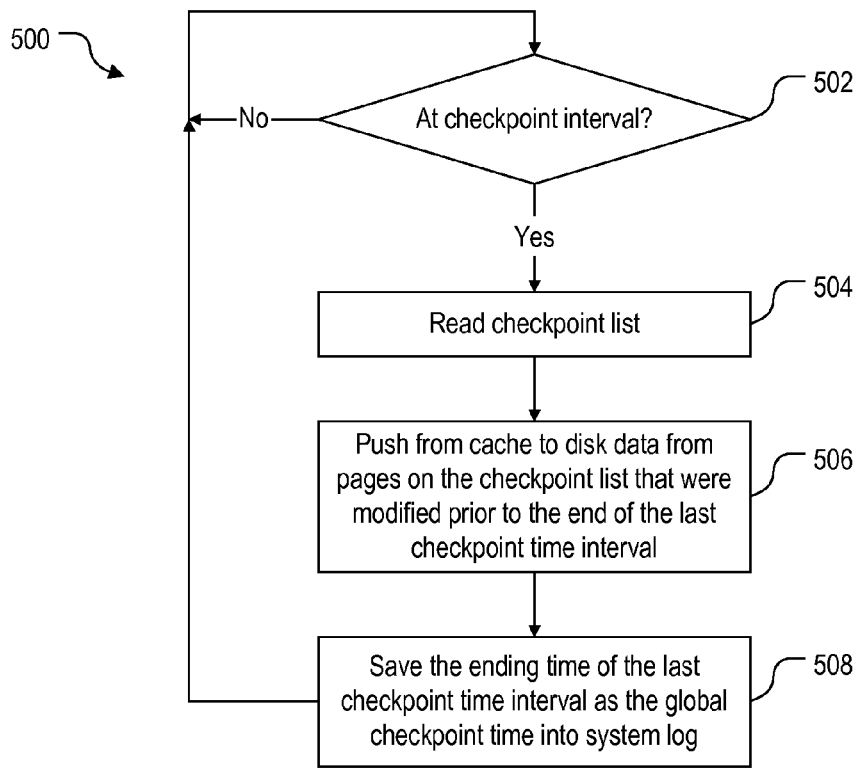
FIG. 5 is a flowchart of a method for a checkpoint time process of FIG. 3 in one embodiment of the invention.

FIG. 5 is a flowchart of a method 500 of checkpoint time process 304 executed by processor 208 in one embodiment of the invention.

In step 502, checkpoint time process 304 determines if the end of the current checkpoint interval has been reached. If so, a new checkpoint interval is started and step 502 is followed by step 504. Otherwise, checkpoint time process 304 continues to wait until the end of the current checkpoint interval has been reached.

In step 504, checkpoint time process 304 reads checkpoint list 306 from nonvolatile storage 214 and determines the pages that were modified prior to the end of the prior checkpoint interval. Step 504 is followed by step 506.

In step 506, checkpoint time process 304 pushes the data in those pages that were modified prior to the end of the prior checkpoint interval to nonvolatile storage 214. Step 506 is followed by step 508.

In step 508, checkpoint time process 304 records the end time of the prior checkpoint interval as the new checkpoint time in system log 308 stored in nonvolatile storage 214. Step 508 is followed by step 502 where checkpoint time process 304 waits for the end of the new checkpoint interval.

Figure 6:
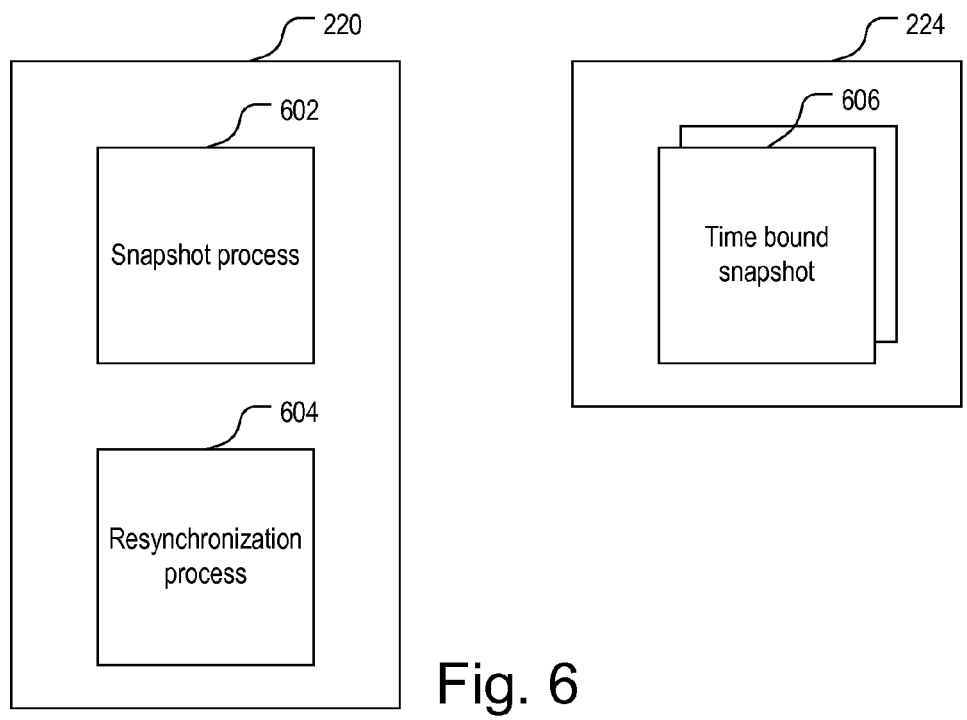
FIG. 6 illustrates processes and data structures on the secondary system for resynchronizing the primary and the secondary systems of FIG. 2 in one embodiment of the invention.

FIG. 6 illustrates processes and data structures on secondary system 204 for the resynchronization process in one embodiment of the invention. System memory 220 stores a time bound snapshot process 602 and a resynchronization process 604 executed by processor 218.

Time bound snapshot process 602 takes COW snapshots 606 of the remote copy at a regular snapshot interval greater than the checkpoint interval. Note that the remote copy may include data in nonvolatile storage 224 and data in secondary cache 222 that have not been flushed to nonvolatile storage 224. Time bound snapshot process 602 stores snapshots 606 in nonvolatile storage 224. In one embodiment, only the three most recent snapshots 606 are kept and older snapshots 606 are deleted.

Resynchronization process 604 determines data that may have been lost in cache memory 210 of primary system 202 from the checkpoint time and time bound snapshots 606 when primary system 202 has an uncontrolled shutdown.

If secondary system 204 has multiple nodes in a cluster, then the processes and the data structures described above for FIG. 6 can be implemented at one node or at multiple nodes of the cluster.

Figure 7:
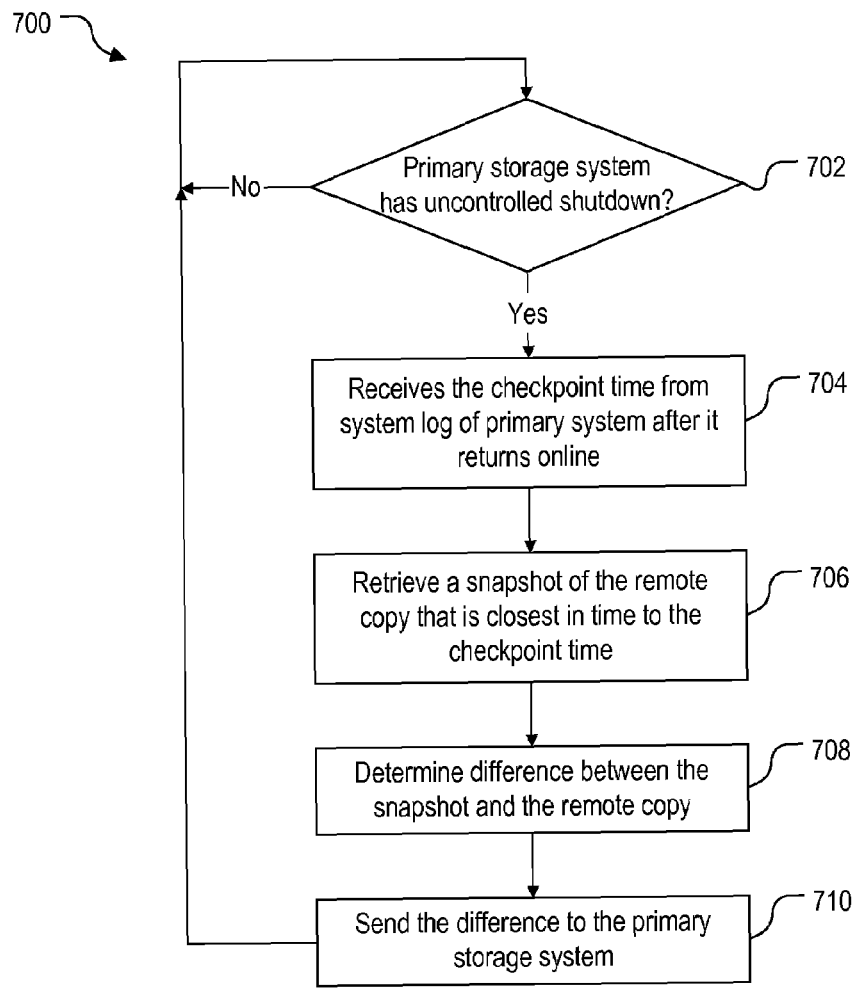
FIG. 7 is a flowchart of a method for a resynchronization process of FIG. 6 in one embodiment of the invention.

FIG. 7 illustrates is a flowchart of a method 700 of resynchronization process 604 executed by processor 218 in one embodiment of the invention.

In step 702, resynchronization process 604 determines if primary system 202 has an uncontrolled shutdown. If so, then step 702 is followed by step 704. Otherwise step 702 repeats until primary system 202 has an uncontrolled shutdown.

Typically a user manually informs resynchronization process 604 that primary system 202 has had an uncontrolled shutdown.

In step 704, resynchronization process 604 receives the checkpoint time from system log 308 of primary system 202 after primary system 202 returns online. Step 704 is followed by step 706. Typically a user manually informs resynchronization process 604 of the checkpoint time and identifies the logic volume that stores the remote copy.

In step 706, resynchronization process 604 retrieves the last time bound snapshot 606 taken of the remote copy before the checkpoint time from nonvolatile storage 224. Step 706 is followed by step 708.

In step 708, resynchronization process 604 determines a snapshot difference between the retrieved snapshot 606 and the remote copy. Specifically, resynchronization process 604 determines the data blocks in the retrieved snapshot 606 and then retrieves the corresponding data blocks from the remote copy as the differences. Step 708 is followed by step 710.

In step 710, resynchronization process 604 sends the snapshot difference to primary system 202, which then updates the data in nonvolatile storage 214. Resynchronization process 604 sends the snapshot difference by copying blocks from the remote copy to primary system 202.

Figure 8:
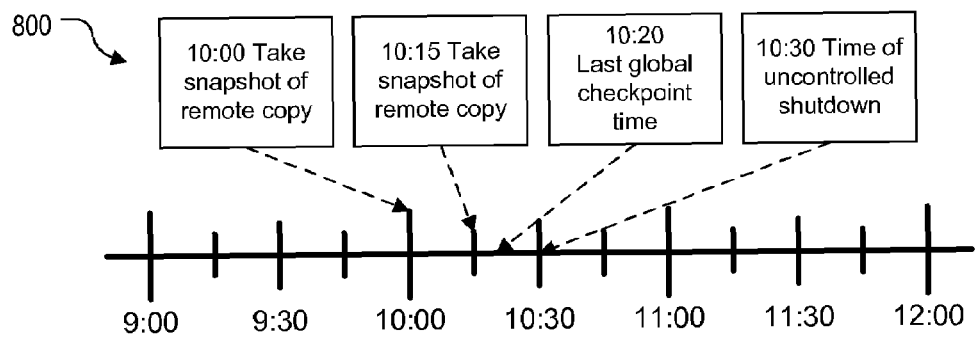
FIG. 8 is a timeline demonstrating an exemplary resynchronization process in one embodiment of the invention.

FIG. 8 is a timeline demonstrating the operation of resynchronization process 604 in one embodiment. On primary system 202, assume the checkpoint interval is 10 minutes and the last checkpoint time is 10:20 a.m. This means that all the data that were first modified before 10:20 a.m. have been pushed from cache memory 212 to nonvolatile storage 214 and cache memory 212 has data that were first modified in the period from 10:20 a.m. to 10:30 a.m.

On secondary system 204, assume time bound snapshots were taken at intervals of 10 minutes starting at 10:00 a.m. Note there is no synchronization required between primary system 202 and secondary system 204 with regards to the taking of snapshots on secondary system 204.

At 10:30 a.m., primary system 202 had an uncontrolled shutdown that results in the loss of data in cache memory 212. After the uncontrolled shutdown, the primary reboots and returns online.

As the global checkpoint time is at 10:20 a.m., primary system 202 has lost 10 minutes of data. Now, secondary system 204 determines a snapshot difference between the snapshot taken at 10:15 a.m. and the remote copy of the data. The snapshot difference includes the data that were modified between 10:20 and 10:30 a.m. Note there is a small overlap of data since the difference between the snapshot taken at 10:15 a.m. and the remote copy would return all the data modified between 10:15 a.m. and 10:30 a.m.

Secondary system 204 sends the snapshot difference to primary system 202. Since the snapshot difference is relatively small, the time required to resynchronize primary system 202 is short. Thus, the resynchronization method described above adds a new dimension to recovering the data on primary system 202 where a remote copy functions as a high availability solution instead of just a disaster recovery solution.

While the resynchronization process has been described from primary system 202 to secondary system 204, the same process can also be applied concurrently from secondary system 204 to primary system 202. In such a setup, secondary system 204 also mirrors host writes to primary system 202 to maintain a remote copy of the data on secondary system 204 at primary system 202. Secondary system 204 also includes a checkpoint list process 302 that timestamps modified data, and a checkpoint time process 304 that flushes data from cache to nonvolatile storage and updates a checkpoint time.

In conjunction, primary system 202 includes a snapshot process 602 that takes snapshots of the remote copy. Primary system 202 also includes a resynchronization process 604 that determines a snapshot closest in time to the checkpoint time, determines a snapshot difference between the snapshot and the remote copy, and sends the difference to secondary system 204 to recover lost data.

Various other adaptations and combinations of features of the embodiments disclosed are within the scope of the invention. Numerous embodiments are encompassed by the following claims.

What is claimed is:

1. A method for resynchronizing data between first and second storage systems, comprising:

the first storage system synchronously mirroring data on the first storage system to the second storage system, comprising:

the first storage system receiving a host write to a first cache of the first storage system;

the first storage system timestamping modified data in the first cache from the host write; and the first storage system mirroring the host write to a second cache of the second storage system, wherein the second storage system maintains a remote copy of the data on the first storage system;

at a regular checkpoint interval, the first storage system pushing any data in the first cache that were modified prior to a respective checkpoint time to a first nonvolatile storage of the first storage system and saving the checkpoint time to the first nonvolatile storage;

at a regular snapshot interval greater than the checkpoint interval, the second storage system taking a respective snapshot of the remote copy; and when the first storage system has an uncontrolled shutdown:

the second storage system receiving the checkpoint time closest in time to the uncontrolled shutdown from the first system;

the second storage system determining a difference between (1) a snapshot closest in time to the checkpoint time and (2) the remote copy on the second storage system;

the second storage system sending the difference between the snapshot and the remote copy to the first storage system after the first storage system returns online; and the first storage system updating the data on the first storage system with the difference.

2. The method of claim 1, wherein:

the data in the first cache are stored in pages; and the first storage system timestamps the modified data in the first cache by keeping a list of the pages and corresponding times when the pages are modified.

3. The method of claim 2, wherein the list is arranged from oldest to most recently modified pages.

4. The method of claim 2, wherein the first storage system pushes the data in the first cache to the first nonvolatile storage by determining pages in the list of pages that were modified prior to the checkpoint time and pushing data in those pages to the first nonvolatile storage.

5. The method of claim 1, wherein the second storage system determines the difference by determining old data in the snapshot and retrieving corresponding new data in the remote copy as the difference.

6. The method of claim 5, wherein said sending the difference comprises the second storage system copying blocks of the new data in the remote copy to the first storage system.

7. The method of claim 1, wherein said synchronously mirroring further comprises:
the second storage system acknowledging the mirrored host write to the first storage system; and
the first storage system acknowledging the host write to a host.

8. The method of claim 1, further comprising:
the second storage system synchronously mirroring data on the second storage system to the first storage system, comprising:
the second storage system receiving another host write to the second cache;
the second storage system timestamping modified data in the second cache from the another host write; and
the second storage system mirroring the another host write to the first cache, wherein the first storage system maintains another remote copy of the data on the second storage system;
at another regular checkpoint interval, the second storage system pushing any data in the second cache that were modified prior to another respective checkpoint time to a second nonvolatile storage of the second storage system and saving the another checkpoint time to the second nonvolatile storage;
at another regular snapshot interval greater than the another checkpoint interval, the first storage system taking another respective snapshot of the another remote copy; and
when the second storage system has an uncontrolled shutdown:
the first storage system receiving the another checkpoint time closest in time to the uncontrolled shutdown of the second storage system;
the first storage system determining another difference between (1) an another snapshot closest in time to the uncontrolled shutdown and (2) the another remote copy on the first storage system;
the first storage system sending the another difference to the second storage system after the second storage system returns online; and
the second storage system updating the data on the second storage system with the another difference.

* * * * *